United States Patent
Lich et al.

(10) Patent No.: US 8,116,949 B2
(45) Date of Patent: Feb. 14, 2012

(54) METHOD AND DEVICE FOR DETERMINING AN INITIAL FLOAT ANGLE FOR SKID DETECTION IN ROLLOVER SENSING

(75) Inventors: Thomas Lich, Schwaikheim (DE);
Michael Schmid, Kornwestheim (DE);
Mario Kroeninger, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 760 days.

(21) Appl. No.: 11/885,290

(22) PCT Filed: Dec. 30, 2005

(86) PCT No.: PCT/EP2005/057235
§ 371 (c)(1),
(2), (4) Date: Nov. 14, 2008

(87) PCT Pub. No.: WO2006/092183
PCT Pub. Date: Sep. 8, 2006

(65) Prior Publication Data
US 2009/0216409 A1 Aug. 27, 2009

(30) Foreign Application Priority Data
Feb. 28, 2005 (DE) .................. 10 2005 008 976

(51) Int. Cl.
*B60R 21/013* (2006.01)
(52) U.S. Cl. ......................... 701/45; 180/282
(58) Field of Classification Search .......... 701/36, 701/37, 38, 39, 45, 70; 280/5.5, 5.501, 5.502, 280/755, 5.507, 5.513; 180/271, 282
See application file for complete search history.

(56) References Cited

U.S. PATENT DOCUMENTS

| | | | | |
|---|---|---|---|---|
| 5,455,770 A | * | 10/1995 | Hadeler et al. | 701/70 |
| 6,266,599 B1 | * | 7/2001 | Van Zanten et al. | 701/71 |
| 6,360,157 B1 | * | 3/2002 | Hartmann | 701/70 |
| 6,496,759 B1 | * | 12/2002 | Mattes et al. | 701/1 |
| 6,671,605 B2 | * | 12/2003 | Ehret et al. | 701/70 |
| 7,162,340 B2 | * | 1/2007 | Schubert et al. | 701/38 |
| 7,664,587 B2 | * | 2/2010 | Kroeninger et al. | 701/70 |
| 2004/0030479 A1 | * | 2/2004 | Arndt et al. | 701/70 |
| 2004/0073346 A1 | * | 4/2004 | Roelleke | 701/45 |
| 2006/0015237 A1 | * | 1/2006 | Kroeninger et al. | 701/70 |

FOREIGN PATENT DOCUMENTS

| | | |
|---|---|---|
| AU | 724 744 | 9/2000 |
| DE | 43 05 155 | 8/1994 |
| DE | 197 08 508 | 3/1998 |
| DE | 198 28 338 | 12/1999 |

(Continued)

*Primary Examiner* — Paul N Dickson
*Assistant Examiner* — Barry Gooden, Jr.
(74) *Attorney, Agent, or Firm* — Kenyon & Kenyon LLP (57) ABSTRACT

A method for determining an initial float angle for skid detection in rollover sensing of a rollover of a vehicle having at least one sensor system for vehicle-dynamic signals and a control unit for activating a restraining device, which divides the driving state of the vehicle into chronologically consecutive state phases, having the following method steps carried out continuously in the first state phase: calculating a change in the float angle from the vehicle-dynamic signals; comparing the calculated change in the float angle with a predefinable threshold value; and determining the initial float angle on the basis of the calculated change in the float angle as a function of the threshold value for a first range of small changes in the float angle or for a second range of larger values of changes in the float angle and a device therefor.

7 Claims, 5 Drawing Sheets

FOREIGN PATENT DOCUMENTS

| | | |
|---|---|---|
| DE | 100 19 416 | 10/2001 |
| DE | 100 19 417 | 10/2001 |
| DE | 101 49 112 | 4/2003 |
| DE | 102 39 406 | 3/2004 |
| JP | 2005-536393 | 12/2005 |
| WO | WO 2004/020253 | 3/2004 |

* cited by examiner

METHOD AND DEVICE FOR DETERMINING AN INITIAL FLOAT ANGLE FOR SKID DETECTION IN ROLLOVER SENSING

FIELD OF THE INVENTION

The present invention relates to a method and a device for determining an initial float angle for skid detection in rollover sensing.

BACKGROUND INFORMATION

German Patent Application Nos. DE 100 19 416 A1, DE 100 19 417 A1, and DE 100 19 418 A1 describe general concepts for rollover sensing using methods and devices based on the analysis of a yaw rate sensor and two acceleration sensors which are integrated in the central airbag control unit. The yaw rate sensor ascertains, by the gyroscopic principle, the rotation rate about the longitudinal axis of the vehicle; in addition, the acceleration sensors measure the acceleration of the vehicle in the direction of the transverse and vertical axes of the vehicle. The yaw rate is analyzed in the main algorithm. Using the measured values of the acceleration sensors, the type of rollover may be recognized, and these values are also used for plausibility checking. If the yaw rate algorithm detects a rollover, safety measures are activated only if they are enabled by the plausibility check at the same time.

A timely deployment decision in the event of a rollover at a high lateral acceleration by taking into account a float angle and a transverse velocity of the vehicle, as well as a vehicle tipping motion, is described in German Patent Application No. DE 101 49 112 A1.

However, the float angle and therefrom the lateral velocity as needed for rollover detection are not determinable by conventional methods such as used in vehicle dynamics control, for example, in an angle range greater than 20°. These methods, such as those using a model from tire characteristics and lateral force, for example, are suitable only for angle ranges of less than 10°. The reason for the small validity range is that vehicle dynamics control may no longer be successfully performed at larger float angles.

German Patent Application No. DE 102 39 406 A1 describes a device for determining float angles greater than 20° and the lateral velocity for rollover detection. This device divides the vehicle's state into chronologically consecutive phases and determines the float angle and the vehicle's transverse velocity from the vehicle dynamics data differently in the individual phases. The disadvantage here is that the initial float angle for "setting up" the algorithm is a constant parameter, which is a function of the application and of the vehicle.

SUMMARY

A method and device according to an example embodiment of the present invention for determining an initial float angle for skid detection in rollover sensing may make it possible to continuously estimate the initial float angle. This may have the advantage over the related art that even in the case of larger float angles a correct "setup" of the algorithm is ensured, from which then a correct lateral velocity results.

In accordance with the present invention, a continuous initial float angle estimate, which, in the case of a break-away of the vehicle, is used as the initial angle of the algorithm. The ascertained initial angle may assume magnitudes from ±0 to a parametrizable value on the order of 40°.

Critical driving maneuvers occur in practice, which may result in a slow increase in the float angle, especially in the case of low friction coefficients, i.e., on ice or a wet road surface. If the vehicle dynamics control system, such as ESP, for example, is unable to provide active support, the likelihood of a potential rollover in which the vehicle lands laterally on the hard shoulder increases. Up to a certain point in time, the signals which are barely relevant for the vehicle dynamics analysis algorithm (FDA or VDA) in the case of a slow drift may occur. This means that the quantities used for determining the lateral velocity, such as yaw rate, longitudinal and lateral accelerations and longitudinal velocity, are such that they do not result in the algorithm being activated via the set threshold values. However, if the thresholds are further lowered, this results in misuse situations which may manifest in undesirable effects. One advantage of the present invention may be that the initial float angle is continuously estimated in the background and, if the critical thresholds are exceeded, an initial float angle adapted to the particular situation is made available to the vehicle dynamics algorithm.

This provides an additional advantage that the sturdiness of the algorithm is not impaired, while the lateral velocity is better estimated. The difference or phase shift that occurs between actual and estimated float angle may thus be minimized, and the determination of the lateral velocity may be exactly reproduced when the critical velocity is attained. Improved resolution performance may thus be achieved, because the point in time at which the vehicle may or may not roll over in the case of a soil trip event may be determined more accurately. The reliability of other applications that use the lateral velocity as an input quantity is thus also increased.

In one embodiment, a method is provided for determining an initial float angle for skid detection in rollover sensing of a rollover of a vehicle having at least one sensor system for vehicle-dynamic signals and a control unit for activating a restraining device. The example method divides the driving state of the vehicle into chronologically consecutive state phases, and includes the following method steps carried out continuously in the first state phase:

(S1) calculating a change in the float angle from the vehicle-dynamic signals;

(S2) comparing the calculated change in the float angle with a predefinable threshold value; and (S3) determining the initial float angle on the basis of the calculated change in the float angle as a function of the threshold value for a first range of small changes in the float angle or for a second range of larger values of changes in the float angle.

It may be advantageous if method step (S3) has the following substeps:

(S3.1) resetting or inputting the output values of the vehicle-dynamic signals using a reset logic;

(S3.2) determining the initial float angle by integrating the calculated change in the float angle using an integration constant in the first range; or (S3.3) determining the initial float angle by integrating the calculated change in the float angle without an integration constant in the second range;

(S3.4) outputting the initial float angle thus determined for the second state phase at a breakaway point in time; or (S3.5) returning to the method step if the comparison with the predefinable threshold value again results in the first range.

The integration constant is parametrizable and has values <1. Advantageously, in this way the float angle does not result in distortions due to the continuous integration and the related problem of long-time drift.

The first range of small changes in the float angle ($\dot{\beta}$) is advantageously formed for $0°<|\beta|<4°$, and the second range of larger changes in the float angle ($\dot{\beta}$) for $Y°<|\beta|<X°$, parameters Y and X being predefinable or parametrizable. In this case, straight-line travel may be advantageously distinguished from dynamic cornering, a breakaway being more likely in the case of cornering.

In one embodiment, a device is provided for determining an initial float angle for skid detection in rollover sensing of a rollover of a vehicle having at least one sensor system for vehicle-dynamic signals and a control unit for activating a restraining device, which divides the driving state of the vehicle into chronologically consecutive state phases. The device has a computing unit for continuous computing of the initial float angle.

In a particularly preferred embodiment, the computing unit has an initial float angle determination unit having:
  a first logic block for determining a change in the float angle from the vehicle-dynamic signals;
  a second logic block for determining a change in the float angle from the vehicle-dynamic signals;
  a comparison block for comparing the change in the float angle from the second logic block and for outputting a comparison signal;
  a third logic block for selecting a subphase unit on the basis of the comparison signal from the comparison block;
  an integration block for integrating the change in the float angle delivered by the first logic block;
  a reset logic for resetting or ascertaining the output values of the vehicle-dynamic signals;
  a first subphase unit for calculating the initial float angle, having a first formula using the output values of the reset logic and of the integration block;
  an output block for outputting the calculated initial float angle to a downstream second state phase; and having
  a memory device for storing predefinable data values.

It may be advantageous if the computing unit is designed as a component of the software of the control unit, so that no additional space is needed for the device according to the present invention.

BRIEF DESCRIPTION OF THE DRAWINGS

The present invention is explained below in detail with reference to the exemplary embodiment depicted in the figures.

DETAILED DESCRIPTION OF EXAMPLE EMBODIMENTS

Passive safety in the event of vehicle rollover is very important, since a large proportion of fatal single-vehicle accidents are caused by rollover. Vehicle rollover currently represents approximately 20 percent of all accidents.

Against this background, there are concepts for rollover sensing which are capable of recognizing a vehicle rollover, for example, at an early point in time. This ensures that safety devices such as seatbelt tensioners, head airbags, and rollover bars are deployed in a timely manner and a risk of injury is reduced. Previous rollover detection systems consider the rolling motion and the accelerations in the x, y, and z directions of the vehicle. Reliable detection of a vehicle rollover is possible on this basis. However, it is possible to make a reliable decision only at a later point in time of the rollover, which is typically at a roll angle of 20° to 40°. In certain rollover cases, this is, however, too late, for example, in the event of so-called soil trips, in which the vehicle gets onto the hard shoulder and may skid due to the different characteristics of road and hard shoulder.

Such a decision made too late may not sufficiently protect the occupants, since they have already experienced a sideways displacement due to a high lateral acceleration, which limits the usefulness of window airbags, for example.

Figure 1:
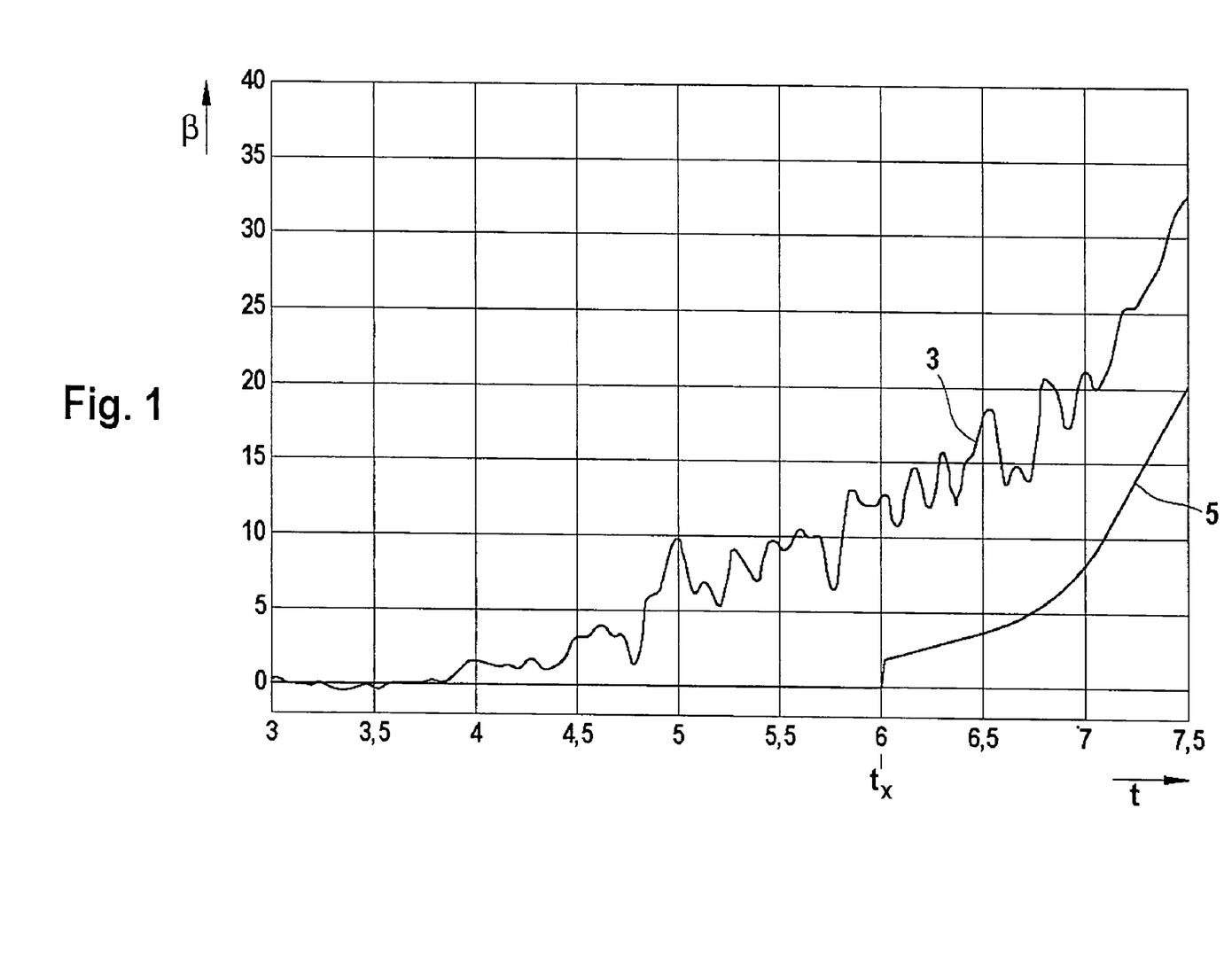
FIG. 1 shows a graphic representation of an estimated float angle curve compared with a reference float angle according to the related art.

In order to be able to make this late decision earlier, a float angle of the vehicle is also taken into account in a rollover detection as in the related art described above. FIG. 1 shows the initial situation in which the present invention is deployed; it shows a graphic representation of an estimated float angle curve 5 compared with a reference float angle 3.

The variation of actual float angle β in the event of a skid is plotted against time t as a reference float angle 3. Curve 5 represents a second float angle, estimated by the algorithm. The vehicle is in an initial driving state in which reference float angle 3 is first small, however later increases due to a driving state that is becoming critical, until the vehicle enters a skid at a breakaway point in time $t_x$. At this point in time, the starting value of second estimated float angle 5 is 2° in this example. This starting value is obtained from a constant as explained with respect to the related art. The float angle is now further calculated in the algorithm from this starting value as a function of vehicle dynamic values. It is clearly apparent that this calculated value follows the variation of actual float angle 3; however, there is a difference of approximately 11°, which is also referred to as a phase shift.

This second estimated float angle 5 is now used for calculating a lateral velocity $v_y$ using the following equation:

$$v_y = v_x * \tan(\beta) \qquad (1)$$

where $v_x$ is the vehicle velocity and β is estimated float angle 5. Therefore, with float angle β, which is 11° less than the actual float angle, an excessively low lateral velocity is also obtained, which may result in excessively late deployment of restraining means.

The present invention makes it possible to calculate the starting value of the float angle continuously, so that it is as close as possible to the actual float angle at breakaway point in time $t_x$, making it possible for the algorithm to perform a further correct calculation.

Figure 2:
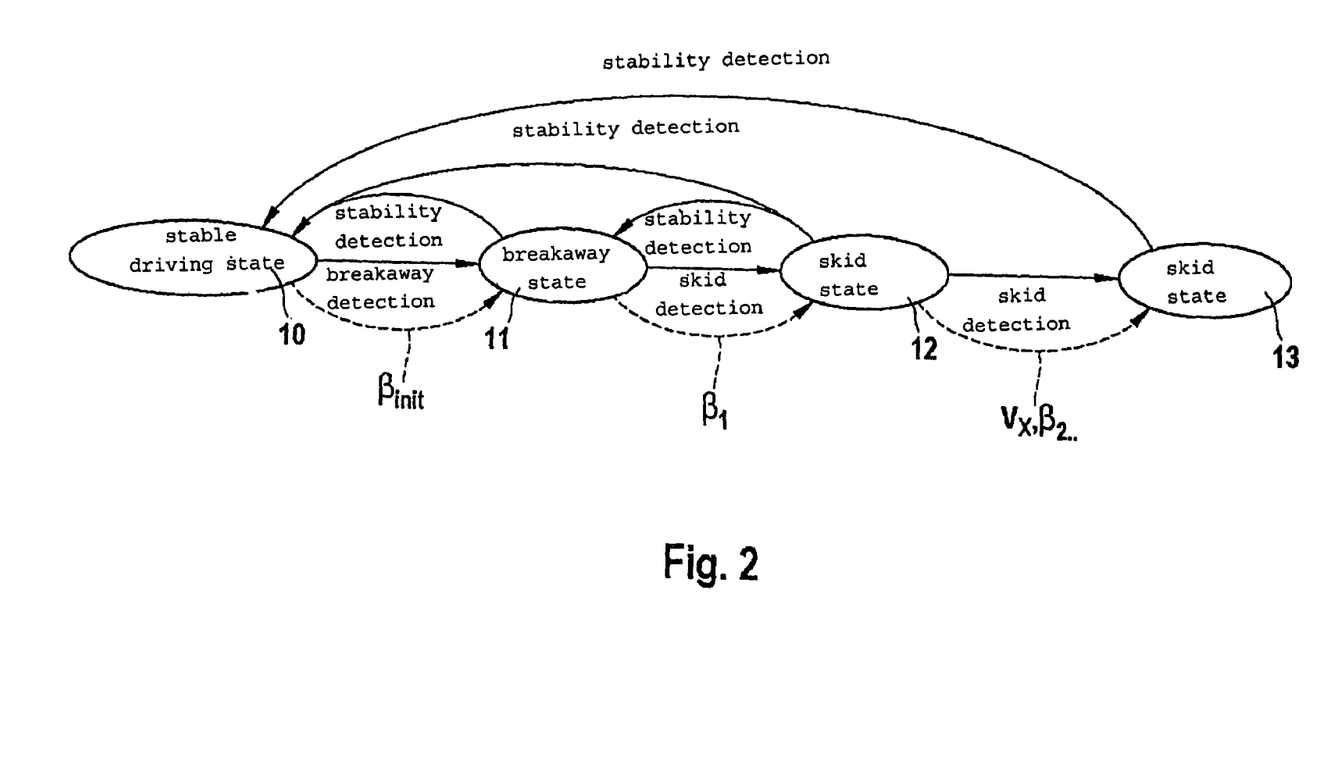
FIG. 2 shows a state diagram of a vehicle dynamics algorithm.

One possible implementation is described in an exemplary specific embodiment below. For this purpose, FIG. 2 shows a state diagram of a vehicle dynamics algorithm having four state phases 10, 11, 12, and 13, through which a vehicle goes consecutively in the event of a skidding sequence. The solid arrows here indicate transitions between the state phases; the dashed arrows indicate the transmission of values between the state phases.

The arrangement of the vehicle dynamics algorithm at that time is characterized by detection of longitudinal velocity $v_x$, yaw rate $\omega_z$ (i.e., the rate of rotation about the vertical axis of the vehicle), lateral acceleration $a_y$, and optionally the wheel speeds, longitudinal acceleration $a_x$, and an estimate of float angle β (which, however, is only valid for small float angles).

First state phase 10 characterizes the stable driving state of the vehicle. At the moment of a breakaway, the starting value of the float angle is transmitted to second state phase 11 as initial float angle $β_{init}$, which characterizes the breakaway state of the vehicle. In this case float angle $β_1$ is calculated based on initial float angle $β_{init}$ and transmitted to third state phase 12, which characterizes the skid state of the vehicle, when a skid is detected. Subsequently $v_x$ and $β_2$ are further calculated for transmission to a third state phase 13. If it is recognized, during state phases 11, 12, and 13, that a stable state has been assumed again, the algorithm returns to the particular previous state phase.

Figure 3:
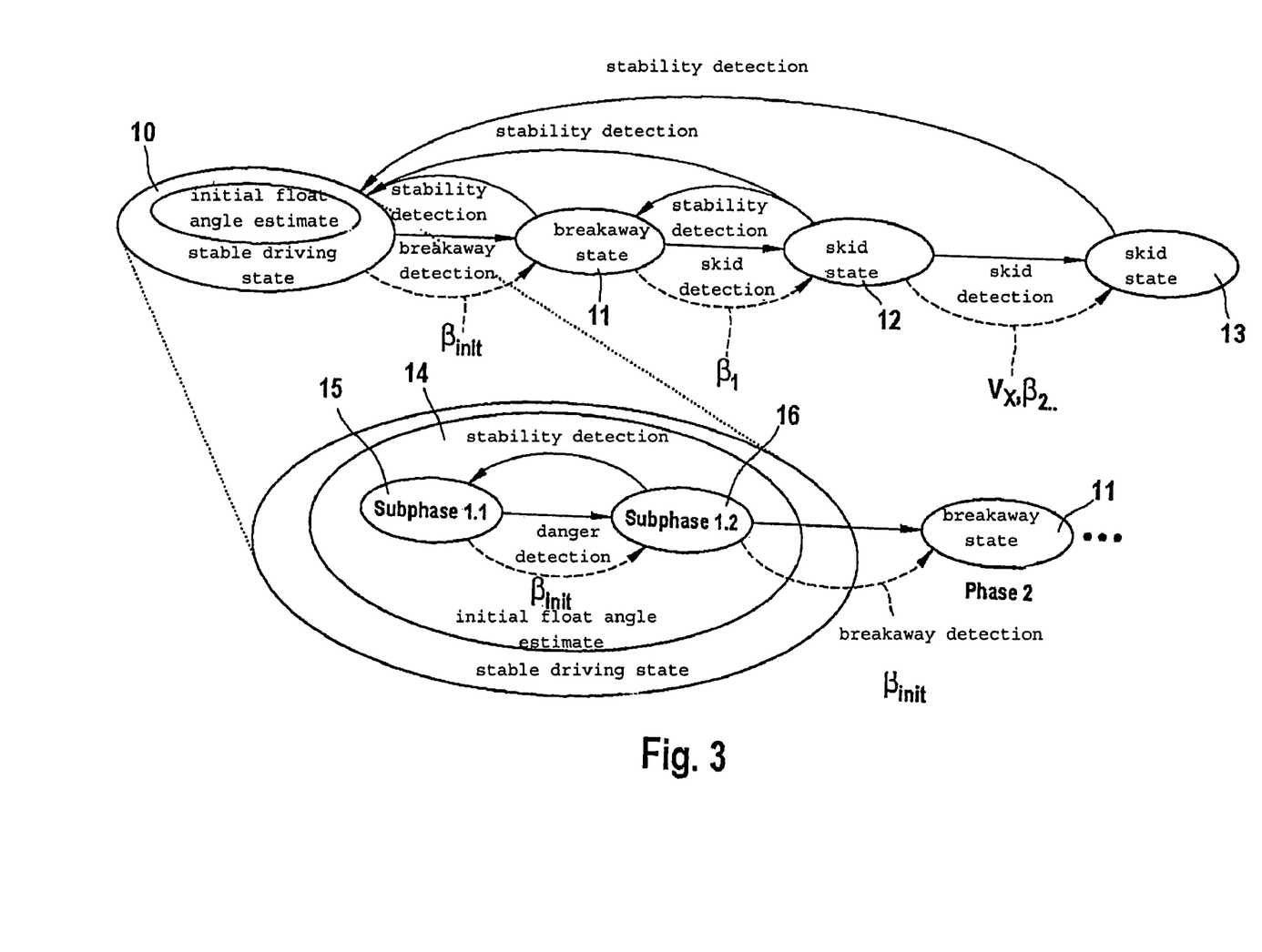
FIG. 3 shows a state diagram of a vehicle dynamics algorithm in an embodiment according to the present invention.

Initial float angle $β_{init}$ is calculated in first state phase 10, which is illustrated in FIG. 3. State phase 10 is shown enlarged with an initial float angle determination unit 14, which has a first subphase unit 15 and a second subphase unit 16. The improved initial float angle estimate runs in the background in first state phase 10. The initial float angle ascertained in second subphase unit 16 is then transmitted to second state phase 11 as initial float angle $β_{init}$ when a vehicle breakaway is detected.

In state phase 10 the vehicle is in normal operation, i.e., in a stable driving state. Cornering operations at a small float angle β are also included in this case. If this state is present, float angle β and lateral velocity $v_y$ are irrelevant for rollover detection, since they are too small to initiate a rollover motion. Estimated lateral velocity $v_y$ is then zero, which is visible to other algorithms. In this first state phase 10, both subphase units 15 and 16 may be implemented. For this purpose, a distinction is made between the following cases:
For first subphase unit 15: $0°<|β|<Y°$ First subphase unit 15 is relevant for "normal" driving, in which small float angles β on the order of magnitude of $Y≈4°$ occur. Estimated initial float angle $β_{init}$ is calculated from:

$$β_{init}=Const·β_0+∫\dot{β}dt \qquad (2)$$

Integration constant Const is parametrizable and has values <1, so that the float angle does not result in distortions due to the continuous integration of a change in float angle $\dot{β}$ and the related problem of long-time drift. In this case, $β_0$ is an application-dependent and vehicle-dependent value for the initial float angle β. A change in float angle $\dot{β}$ then results from the quantities of longitudinal and transverse accelerations $a_x$, $a_y$, yaw rate $ω_z$, and vehicle velocity $v_x$, which is set to be equal to the longitudinal velocity, which are delivered by the sensor system located in the vehicle. The change in float angle $\dot{β}$ is calculated as follows:

$$\dot{β}=ω_z-\frac{a_y\cos(β)+a_x\cos(β)\sin(β)}{v_x}≈ω_z=\frac{a_y}{v_x} \text{ for small } β \qquad (3)$$

For second subphase unit 16: $4°<|β|<X°$
where Y and X are parametrizable.

If larger float angle changes occur, such as in the event of highly dynamic driving onto or off the superhighway, a threshold value is then queried via the simple relationship $$\dot{β}≈ω_z-\frac{a_y}{v_x} \text{ for small } β \qquad (4)$$

so that a change from first subphase unit 15 to second subphase unit 16 takes place. Initial float angle $β_{init}$ is then calculated in second subphase unit 16 from:

$$β_{init}=β_0+∫\dot{β}dt \qquad (5)$$

The change in float angle $\dot{β}$ used here is calculated using equation (3).

Figure 4:
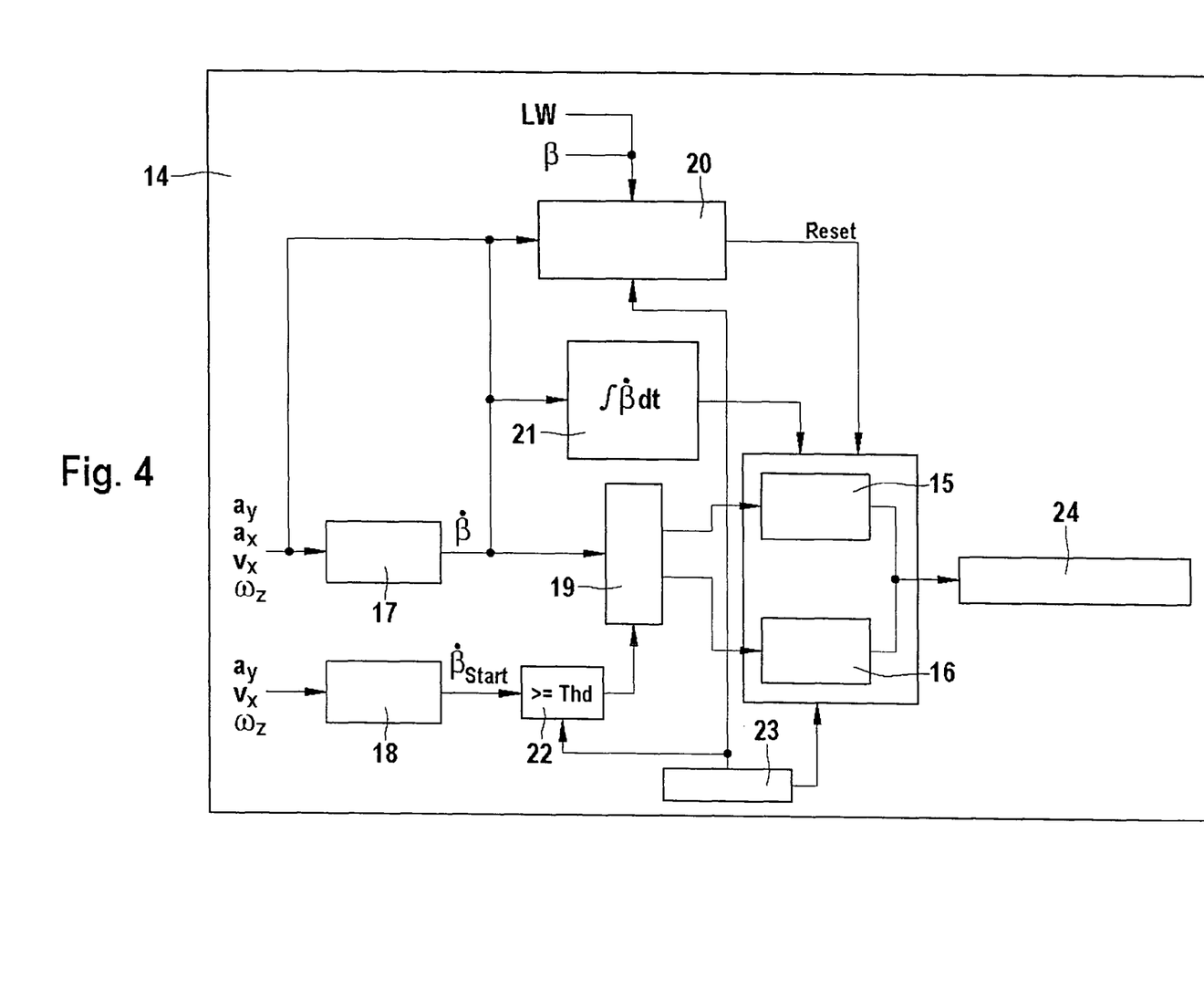
FIG. 4 shows a block diagram of a specific embodiment of an initial float angle determination unit according to the present invention.

This results overall in the specific embodiment according to the present invention, shown in FIG. 4 as an example, of an initial float angle determination unit 14 in the form of a block diagram for determining initial float angle $β_{init}$.

The vehicle dynamic quantities $a_x$, $a_y$, $v_x$, $ω_z$ are delivered from a vehicle dynamics system present in the vehicle or from corresponding sensors and used by a first and a second logic block 17, 18 according to equation (3) for determining the change in float angle $\dot{β}$. At the same time, these and the change in float angle $\dot{β}$ are supplied to a reset logic 20 as input quantities; the reset logic also receives information about a steering angle LW and an initial float angle β provided by the driving dynamics system.

A comparison block 22 compares the change in float angle $\dot{β}$, with a predefinable threshold value and supplies the result to a third logic block 19, which then decides which subphase unit 15, 16 will be used for determining initial float angle $β_{init}$. This is the above-described differentiation between cases.

An integration block 21 first performs the integration of float angle change $\dot{β}$ for formulas (2) and (5) and supplies it, according to the differentiation between cases, to third logic block 19 of first or second subphase unit 15, 16.

First subphase unit 15 determines initial float angle $β_{init}$ according to equation (2) and second subphase unit 16 according to equation (5).

Initial float angle $β_{init}$ thus calculated is supplied to an output block and is available there to the next state phase for relaying.

Reset logic 20 ascertains initial values and boundary conditions for the calculations in subphase units 15 and 16.

It also performs a reset to initial values if stability is detected.

A memory device 23 is used for storing the predefinable threshold value and further application-dependent and vehicle-dependent values.

Figure 5:
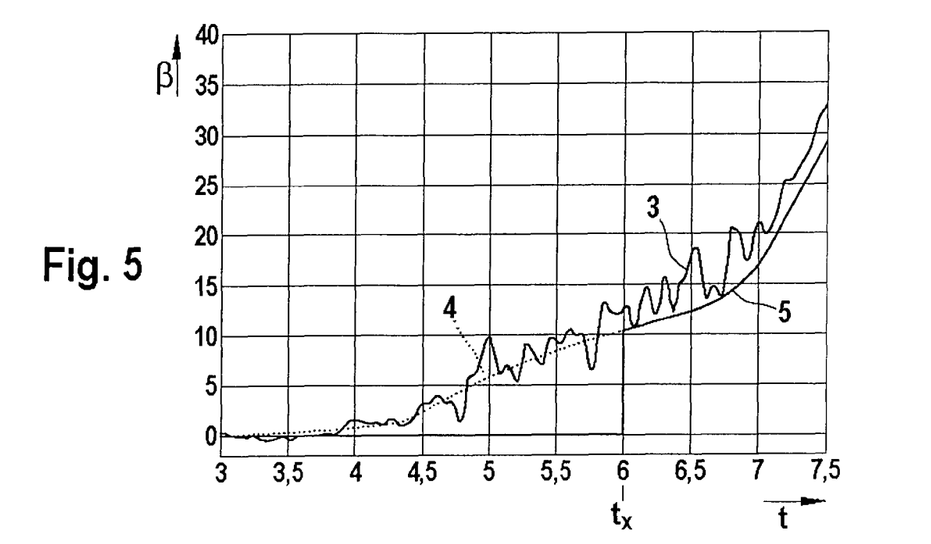
FIG. 5 shows a graphic representation of a float angle curve estimated continuously, compared with a reference float angle according to a specific embodiment of the present invention.

FIG. 5 finally shows the effect of the use of the method according to the present invention for determining initial float angle $β_{init}$. The dashed curve marked 4 represents first estimated initial float angle $β_{init}$, which is transmitted to the algorithm for second state phase 11 at breakaway point in time $t_x$. It is apparent that the determination according to the present invention of initial float angle $β_{init}$ follows the average curve of the reference float angle as actual float angle; at breakaway point in time $t_x$ there is little or no difference with respect to the actual float angle, and the curve of second estimated float angle 5 calculated by the algorithm in the subsequent state phases follows the curve of the actual float angle with a very small difference.

The reliability of the rollover algorithm is thus considerably increased in that the estimate of the lateral velocity is improved.

Figure 6:
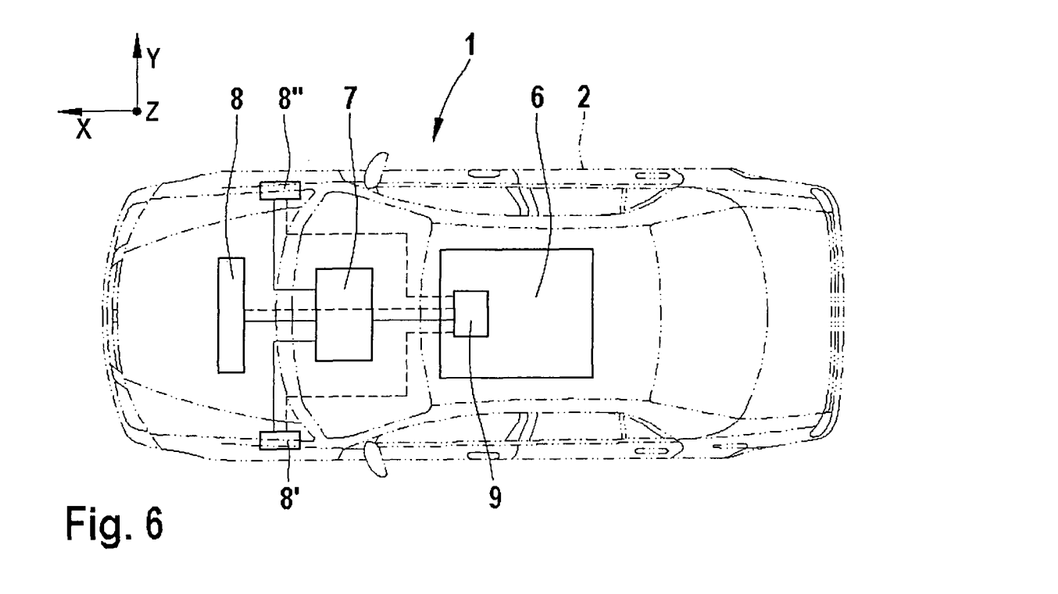
FIG. 6 shows a schematic block diagram of an example device according to the present invention.

FIG. 6 shows a schematic block diagram of a device 1 according to the present invention in a vehicle 2. A sensor system 8, 8', 8" is connected to a system control unit 7, which is a vehicle dynamics controller, for example. Reference numerals 8' and 8" refer, for example, to lateral acceleration sensors and wheel speed sensors. The signal values sampled by sensor system 8, 8', 8" are related to a computing unit 9 in control unit 6. Sensor system 8, 8', 8" may also be totally or partially connected to computing unit 9. Computing unit 9 determines initial float angle $\beta_{init}$.

The present invention is not limited to the above-described exemplary embodiments, but may be modified in many ways.

The reliability of other applications which use the lateral velocity as input quantity may also be increased. These include, for example, the activation or improved deployment performance in the event of side crash deployment.

Computing unit 9 may be designed as software, i.e., a component or a subprogram of the software of control unit 6.

It is also possible that computing unit 9 is a separate unit or a component of system control unit 7.

What is claimed is:

1. A method for determining an initial float angle for skid detection in rollover sensing of a rollover of a vehicle having at least one sensor system for vehicle-dynamic signals and a control unit for activating a restraining device, the method dividing a driving state of the vehicle into chronologically consecutive state phases, wherein the method steps carried out continuously in a first state phase comprises:
   (S1) calculating a change in a float angle from the vehicle-dynamic signals;
   (S2) comparing the calculated change in the float angle with a predefined threshold value; and
   (S3) determining the initial float angle based on the calculated change in the float angle, wherein the determination of the initial float angle is made using one of two different determining methods as a function of the comparison with the predefined threshold value, wherein a first determining method is used for a first range of small changes in the float angle and a second determining method is used for a second range of larger values of changes in the float angle.

2. The method as recited in claim 1, wherein in the method step (S3), the first determining method includes determining the initial float angle by integrating the calculated change in the float angle using an integration constant in the first range, and the second determining method includes determining the initial float angle by integrating the calculated change in the float angle without an integration constant in the second range.

3. The method as recited in claim 2, wherein the integration constant is parametrizable and has values <1.

4. The method as recited in claim 1, wherein the first range of small changes in the float angle applies to $0°<|\beta|<Y°$ and the second range for larger changes in the float angle ($\dot{\beta}$) applies to $Y°<|\beta|<X°$.

5. The method as recited in claim 4, wherein the parameters Y and X are one of predefined or parametrizable.

6. A device for determining an initial float angle for skid detection in rollover sensing of a rollover of a vehicle having at least one sensor system for vehicle-dynamic signals and a control unit for activating a restraining device, which divides the driving state of the vehicle into chronologically consecutive state phases, the device comprising:
   a computing unit configured to continously compute the initial float angle in at least a first state phase, wherein the computing unit includes an initial float angle determining unit, including:
      a first logic block to determine a change in the float angle from the vehicle-dynamic signals;
      a second logic block to determine a change in the float angle from the vehicle-dynamic signals;
      a comparison block to compare the change in the float angle from the second logic block with a predefined threshold value and to output a comparison signal;
      a third logic block to select a subphase unit based on the comparison signal from the comparison block;
      an integration block to integrate the change in the float angle from the first logic block;
      a reset logic to reset or ascertain output values of the vehicle-dynamic signals;
      a first subphase unit to calculate an initial float angle using a first formula and to utilize the output values of the reset logic and of the integration block, wherein the first formula is used for a first range of small changes in the float angle in the first state phase;
      a second subphase unit to calculate an initial float angle using a second formula different from the first formula, wherein the second formula is used for a second range of larger values of changes in the float angle in the first state phase;
      an output block to output the calculated initial float angle to a downstream second state phase; and
      a memory device to store predefined data values.

7. The device as recited in claim 6, wherein the computing unit is a software component of the control unit.

* * * * *